J. W. HARMSLEY.
TRANSPORTATION TICKET.
APPLICATION FILED JUNE 29, 1918.

1,322,017.

Patented Nov. 18, 1919.

UNITED STATES PATENT OFFICE.

JHON W. HARMSLEY, OF WATERLOO, IOWA.

TRANSPORTATION-TICKET.

1,322,017.

Specification of Letters Patent.

Patented Nov. 18, 1919.

Application filed June 29, 1918. Serial No. 242,546.

*To all whom it may concern:*

Be it known that I, JHON W. HARMSLEY, a citizen of the United States, residing at Waterloo, in the county of Blackhawk and State of Iowa, have invented certain new and useful Improvements in Transportation-Tickets, of which the following is a specification, reference being had to the accompanying drawings.

This invention relates to certain improvements in railway tickets, and it is an object of the invention to provide a ticket of this general type wherein the same has associated therewith a check or checks having the same identification as the ticket, and whereby the conductor or other trainman is enabled to check the passengers on the train with speed and certainty.

It is also an object of the invention to provide a novel and improved railway ticket having associated therewith a check whereby the possibility of more than one passenger claiming the right to a single ticket is eliminated.

Another object of the invention is to provide a novel and improved ticket which has associated therewith a passenger's receipt, which is adapted to be retained by the passenger after the ticket has been lifted, and which receipt is also lifted or collected by the conductor or trainman at a reasonably short period of time before the passenger reaches his destination, so that the receipt gives positive and tangible evidence that the passenger had been duly advised by the conductor or other trainman that he or she is about to reach the destination on that road.

A still further object of the invention is to provide a novel and improved railway ticket having associated therewith a check or checks and wherein each of the checks is provided with means for properly identifying the passenger, when the passenger is traveling in a sleeper.

The improved railroad ticket as herein disclosed also comprises novel means whereby a separable check is provided for each passenger division or section over which the passenger travels to reach his destination, and wherein said checks are identified in sequence with corresponding identities carried by the ticket so that as the conductor of each passenger section or division collects or lifts the check for his section or division, the ticket is punched at a corresponding identity thereon so that when the ticket is turned in, together with the checks, a positive record is made of the portions of the road over which the passenger has traveled.

The invention consists in the details of construction and in the combination and arrangement of the several parts of my improved railway ticket whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in plan of the front face of a passenger ticket constructed in accordance with an embodiment of my invention and wherein the ticket calls for a destination requiring the passenger to travel over more than one passenger section or division; and Fig. 2 is a view in plan of the rear or back face of my improved ticket, as herein set forth.

As disclosed in the accompanying drawings, my improved ticket comprises an elongated and preferably rectangular sheet of suitable material, and which is divided into a plurality of sections through the medium of the scored lines 1. It is preferred that the sections of the ticket as afforded by the lines 1 be of substantially the same area so that the ticket may be readily folded to occupy a minimum of space and to facilitate the handling thereof.

The section A, as herein disclosed, comprises the ticket proper and has printed or otherwise produced thereon, the starting point and destination as indicated at 2, together with the name of the railroad with which the ticket is adapted to be employed and as indicated at 3.

One end of the ticket has extending transversely thereacross, a series of differing identities, as indicated at 4, and which identities preferably consist of numerals arranged in sequence, as from "1" up. As herein disclosed, said identities range from "1" to "5" although in practice, it is only essential that the identities be of a number equal to the number of passenger divisions over which the holder of the ticket is entitled to travel.

B denotes an end section of the ticket and is immediately adjacent the section A. This section B is also provided in duplicate as at 5 and 6 with an indication of the starting point and destination. The section B is divided by the scored line 7 between the indications 5 and 6 into two checks X and Y. The check X is the "agent's check" and is retained by the agent who sells the ticket. The check Y serves as a passenger receipt for a purpose and in a manner which will hereinafter be more fully set forth.

The ticket or section A is also identified by an individual number with other identities as indicated at 9 and said number is duplicated on each of the checks X and Y of the section B so that the relation of the checks X and Y with the particular ticket may be readily identified after the checks X and Y have been separated from the ticket or section A.

The remaining sections C, D and E of the ticket each constitutes a hat check. Each of these checks C, D and E has printed or otherwise produced thereon, as indicated at 10 the destination called for by the ticket section A and is also provided with the same identifying number, as indicated at 11, as is carried by the section A. The sections C, D and E are each separately identified, as indicated at 12, and preferably by numerals arranged in sequence, with the lower numeral at the end of the ticket remote from the section B.

In the present embodiment of my invention, three hat checks are employed as the ticket calls for a destination which necessitates the passenger traveling over three passenger divisions. When the conductor or other trainman of the first division collects the transportation for his division, he tears the first check, as E, and uses the same as a hat check to cover the ticket not lifted or collected, and the conductor or trainman also punches an identity 4 in the ticket section A, corresponding to the identity 12 of his check. When the train is in close proximity to the end of the first passenger division, the conductor or other trainman collects the checks and turns the collected checks E in as authority for tickets not lifted or collected. The conductor or trainman of the crew on the next succeeding passenger division repeats the foregoing operation with the second check, as D. When the train is placed in charge of the third or last conductor, he uses or employs the check, as C, as has been hereinbefore set forth relative to the checks D and E. The last conductor also collects the ticket section A but gives to the passenger the check or receipt Y hereinbefore referred to. When the train is within reasonable distance of the destination, the last conductor collects from the passenger the check C and also the check or receipt Y. The receipt Y affords tangible evidence that the passenger has been notified that he has reached his destination, as it is necessary for the conductor to obtain this receipt directly from the passenger.

The check or receipt Y has two advantages, namely, a passenger cannot ride farther than his receipt shows, or collect damages in the event he should pass beyond the station after the surrender of the receipt or check Y.

Each of the checks C, D and E on its front face is provided with a blank space 14 upon which is adapted to be impressed or otherwise produced the date of sale of the ticket, while the back or rear faces of the section A and the checks X and Y of the section B are blank and are adapted to have impressed or otherwise produced thereon the date of sale. These impressions are to be made by the agent or ticket seller in the well known manner.

The rear or back face of each of the sections C, D and E has produced thereon, as at 15, the destination, together with a space as indicated at 16 in which the name of the sleeper in which the passenger is traveling is adapted to be written by the person selling a berth to the passenger.

The rear face of each of the sections C, D and E is also provided with the fields 17 and 18, the field 17 referring to an upper berth and the field 18 referring to a lower berth. Each of these fields 17 and 18 has a sufficient blank space to permit the insertion therein of the number of passengers occupying the berth and which is also adapted to be properly inserted by the person selling the sleeper privileges.

The back or rear face of each of the sections is also provided with the identities 19 corresponding to the identities 4 and 12 hereinbefore referred to and which are adapted to be properly punched by the conductor or other trainman of each of the passenger divisions over which the passenger travels.

My improved ticket, as herein disclosed, obviates the possibility of more than one passenger obtaining transportation on a single ticket. It is recognized by the railroads that it has been a practice for one party to buy a ticket to a certain destination and a second party buy a ticket to the first stop of the train. The passenger buying the ticket to the first destination, will write upon the ticket such matter as will permit him to readily identify this particular ticket. After the conductor has collected the ticket of this party and given him his hat check or receipt, the party will give his hat check or receipt to the passenger who has bought a ticket only to the first station or stop. When the conductor passes through to check his passengers, he notes the passenger without a hat check and requests his ticket. This passenger contends that the conductor has not given him a hat check and in proof of his statement, he will call attention to the fact that on the portion of his ticket which the conductor has lifted he will find some particular matter which he has written thereon and often giving number of ticket. By this it will be seen that both of these passengers will reach a common destination on a single ticket, without either one of said passengers being put off the train. With the use of my improved ticket, this condition is eliminated. Should a passenger claim that he has not received or has lost his hat check, it is only necessary for the conductor to inspect the receipt Y. From the number of that receipt the conductor can then locate the second passenger who has unlawfully availed himself of the privileges of the hat check which the first passenger claimed he had not received or lost.

My improved ticket also serves to facilitate the checking up of passengers in a sleeping car, doing away with the reports of the " small envelop " and the " large envelop " which reports are known on the Illinois Central Railroad as " Form 895 " and " Form 918," respectively. This same thing is used on all roads only under different numbers. Practice has demonstrated that with the use of my improved ticket, a conductor or trainman can check the passengers in a sleeping car in substantially one-fourth of the time required by the system now generally used by all of the railroads.

From the foregoing description, it is thought to be obvious that a railway ticket constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A passenger ticket comprising a plurality of separable sections each bearing printed matter and provided with like identifying data, one of said sections constituting the ticket, a second section constituting a hat check, and a third section constituting a passenger receipt to be retained by the passenger after the ticket section has been collected.

2. A passenger ticket comprising a plurality of separable sections each bearing printed matter and provided with like identifying data, one of said sections constituting the ticket, a second section constituting a hat check, and a third section constituting a passenger receipt to be retained by the passenger after the ticket section has been collected, said passenger receipt being also provided with a separable check constituting an agent's check.

3. A passenger ticket comprising a plurality of separable sections each bearing printed matter and provided with like identifying data, one of said sections constituting the ticket, a second section constituting a hat check, and a third section constituting a passenger receipt to be retained by the passenger after the ticket section has been collected, the ticket section, the hat check and the passenger's receipt being provided with the same destination.

4. A transportation ticket comprising a plurality of separable sections each bearing printed matter, one of said sections constituting a ticket, a second section constituting a passenger's receipt and the remaining sections constituting hat checks each hat check being separately identified, the ticket section being provided with identities corresponding to the different identities of the hat checks, each of the hat checks and the ticket being also provided with a common identity and a common destination.

5. A transportation ticket comprising a plurality of separable sections each bearing printed matter, one of said sections constituting a ticket section, a second section constituting a hat check, and a third section constituting a passenger's receipt, all of said sections having a common identity and a common destination, the hat check being also provided with means for identifying a sleeper, and with delineated spaces for insertion of the number of passengers assigned to each berth of the sleeper.

In testimony whereof I hereunto affix my signature in the presence of two witnesses.

JHON W. HARMSLEY.

Witnesses:
W. E. LAWSON,
A. F. MURTAUGH.